(No Model.) 2 Sheets—Sheet 1.
D. HAIFLEY.
FEED STABLE.
No. 484,791. Patented Oct. 25, 1892.
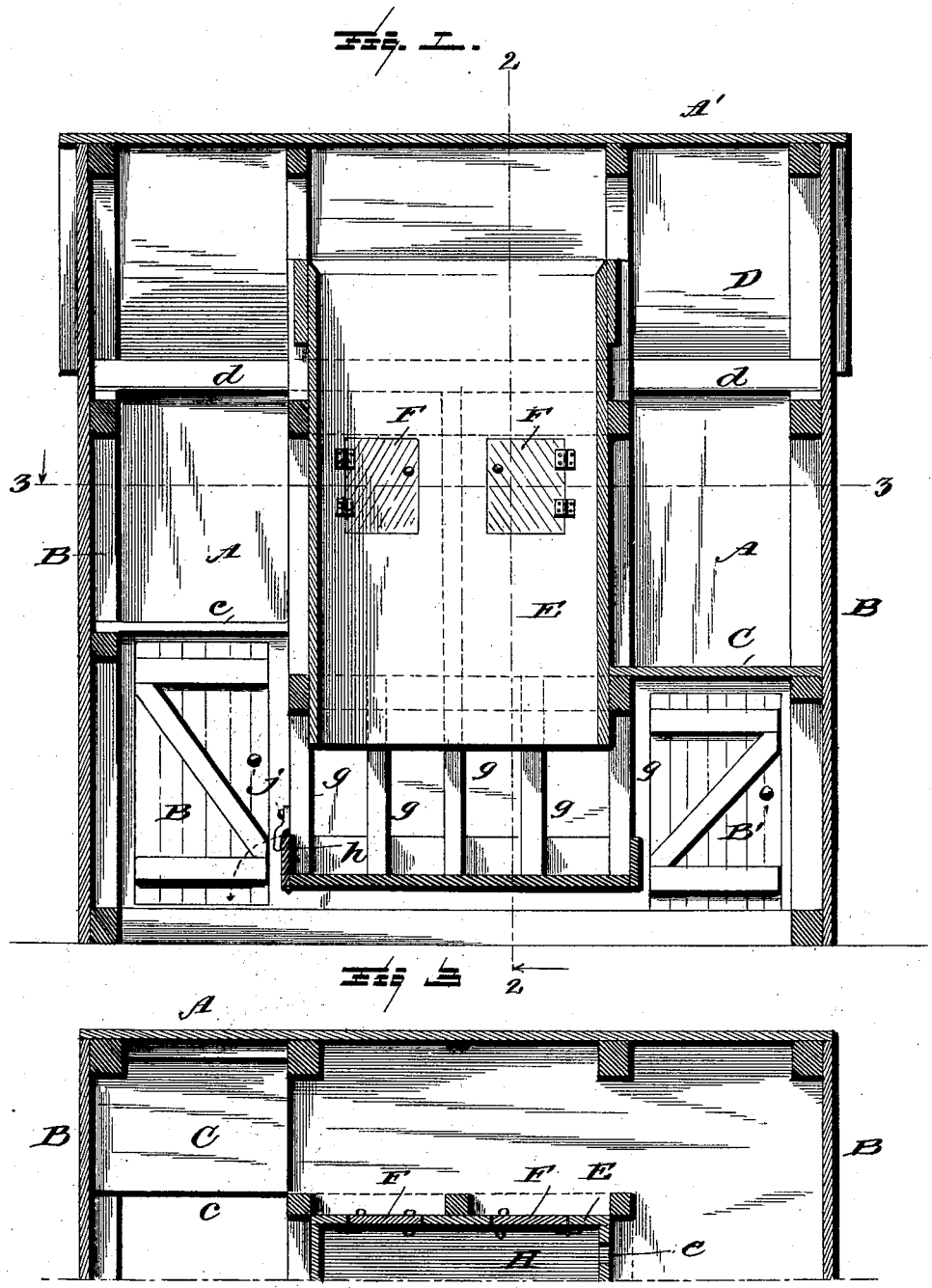
Witnesses
L. C. Hills.
Wm Grant.
Inventor
David Haifley,
per Chas. N. Fowler
Attorney (No Model.)
D. HAIFLEY.
FEED STABLE.
No. 484,791. Patented Oct. 25, 1892.
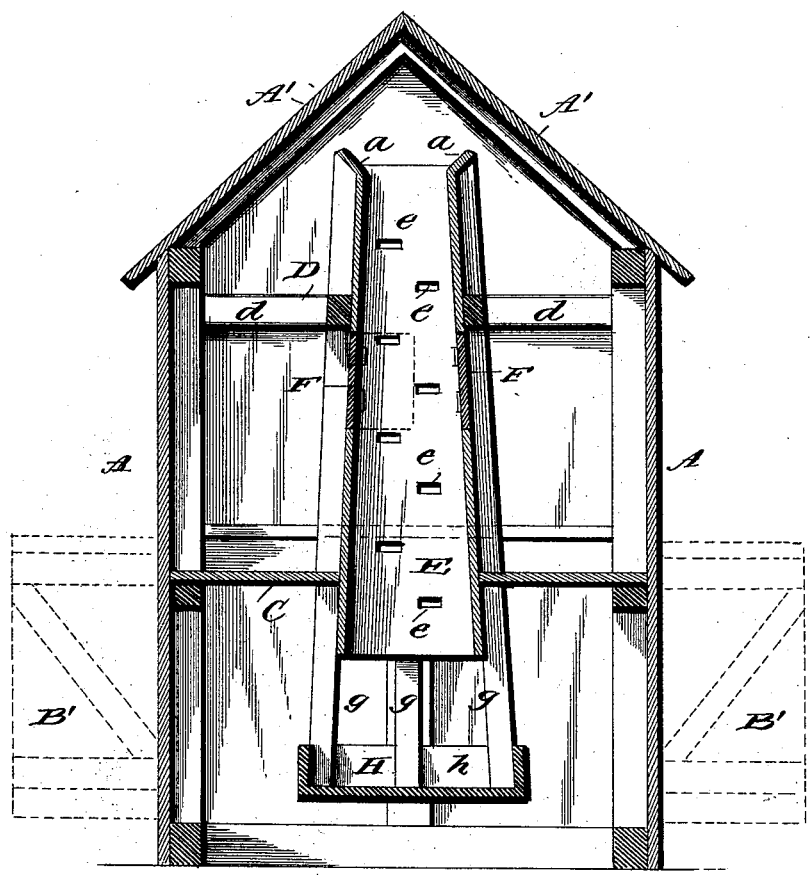

UNITED STATES PATENT OFFICE.

DAVID HAIFLEY, OF AMBOY, INDIANA.

FEED-STABLE.

SPECIFICATION forming part of Letters Patent No. 484,791, dated October 25, 1892.

Application filed April 11, 1892. Serial No. 428,666. (No model.)

*To all whom it may concern:*

Be it known that I, DAVID HAIFLEY, a citizen of the United States, residing at Amboy, in the county of Miami and State of Indiana, have invented certain new and useful Improvements in Feed-Stables; and I do hereby declare that the following is a full, clear, and exact description of the same, reference being had to the annexed drawings, making a part of this specification, and to the letters of reference marked thereon.

This invention relates to certain new and useful improvements in feed-stables, and the novelty resides in the peculiar combinations, construction, arrangement, and adaptation of parts, all as more fully hereinafter shown, described, and then particularly pointed out in the appended claim.

The invention is clearly illustrated in the accompanying drawings, which, with the letters of reference marked thereon, form a part of this specification, and in which—

Figure 1 is a central vertical section through a stable constructed in accordance with my invention. Fig. 2 is a section vertical at right angles to that of Fig. 1, the section being on the line 2 2 of Fig. 1. Fig. 3 is a cross-section on the line 3 3 of Fig. 1 of one-half the stable, looking downward.

Like letters of reference indicate like parts throughout the several views.

Referring now to the details of the drawings by letter, A designates the side and B the end walls of a building provided with a roof A'. The building may be of as many stories as may be desired and provided with suitable doors B'. The second floor C has an opening c, through which access is had to the floor above when desired or through which material may be passed from above. The upper floor D has openings d upon one or both sides of the central shaft soon to be described.

E is a central shaft or chute suitably supported. It is open at the top, as seen, and is tapered, being smaller at the top, so that it will not become clogged by the material being fed therethrough. It is provided with a plurality of openings e at suitable intervals for the escape of the air as the material is being fed through the chute. The upper ends of the walls are inclined, as seen at a in Fig. 2, to aid in the introduction of the material. The chute is provided with suitable doors F above the second floor, through which material may be placed into the chute. The chute is open near its lower end, as seen in Figs. 1 and 2, and the depending posts or strips g support a trough or receptacle H, which may have a hinged side or sides h, hinged to swing downward and held in the vertical position by suitable means, as buttons or analogous devices j.

In practice the material may be fed down the chute into the trough H, from which it may be taken either between the strips g or by letting down the hinged side. The openings in the walls of the chute permit the ready escape of the air, and the taper of the chute, combined with the said openings, prevents clogging of the chute by the material.

What I claim as new is—

A building having a floor C and provided with a tapered central chute open at the top and having a plurality of air-outlet openings and its smaller end at the top and flared outwardly, doors to the chute above said floor C, supports g for the trough, and a trough supported by the lower ends of said supports g at a distance from the floor and provided with a hinged side, the chute being open near its lower end above the said trough, all substantially as and for the purpose specified.

In testimony that I claim the above I have hereunto subscribed my name in the presence of two witnesses.

DAVID HAIFLEY.

Witnesses:
LOUIS B. FULIVILER,
JAMES M. BROWN.